Patented Mar. 11, 1924.

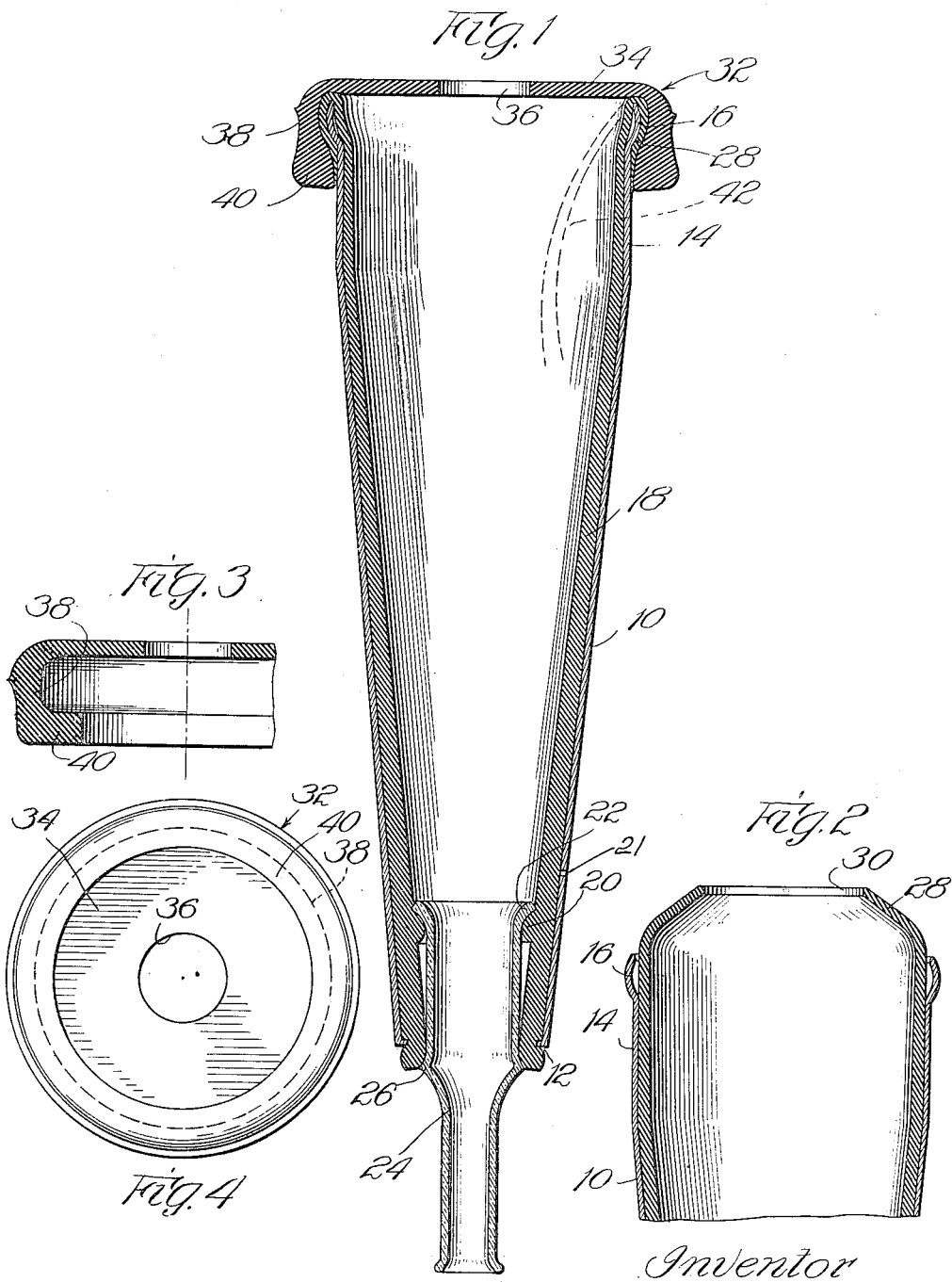

1,486,183

UNITED STATES PATENT OFFICE.

FRANK S. FROST, OF CHICAGO, ILLINOIS, ASSIGNOR TO SEARS, ROEBUCK AND CO., OF CHICAGO, ILLINOIS, A CORPORATION OF NEW YORK.

TEAT CUP.

Application filed May 14, 1920. Serial No. 381,328.

*To all whom it may concern:*

Be it known that I, FRANK S. FROST, a citizen of the United States, residing at Chicago, in the county of Cook and State of Illinois, have invented certain new and useful Improvements in Teat Cups, of which the following is a specification.

My invention relates to milking machines and more specifically to an improved teat cup for use in connection with almost any type of milking machine.

One object of the invention is to increase the durability of the rubber parts heretofore used. An advantage of the construction employed for this purpose is that the teat cup is easier to clean. In my copending application Serial No. 343,408, filed December 8, 1919, I have described and shown a teat cup comprising a metallic casing and a rubber inflation within the casing. The upper lip of the inflation shown engages the base of the teat when in use and this lip deteriorates rapidly especially when formed of the pure rubber preferably employed for the main portion of the inflation. This is believed to be due at least partly to the secretion of an oily substance from glands in the skin of the teat.

The main object of my invention is to eliminate the expense and delay occasioned by frequent renewals of the inflation. An advantage of the construction employed is that the massaging action of the inflation can work higher up on the teat so that the milking action is also improved by the change in construction.

Another advantage is that a teat cup of given size can be used on almost any size teat making it unnecessary to keep several sets of cups for milking cows having large or small teats.

Further objects and advantages of my invention will become apparent as the description proceeds.

In the accompanying drawings, Figure 1 is a section of a teat cup according to my invention. Fig. 2 is a detail section showing the undistorted shape of the inflation before the cap is mounted thereon. Figs. 3 and 4 are a section and a bottom plan view, respectively, of the undistorted form of the cap.

In the embodiment of my invention selected for illustration, the casing 10 comprises a main tapered portion having a lip 12 at its lower end and a short cylindrical portion 14 at its upper end preferably terminated by a bead portion 16. The inflation 18 accurately fits the casing and is held in place at the small thick end by the lip 12. An internal lip 20 engages with the bead 22 at the upper end of the discharge tube 24. The discharge tube preferably has an intermediate bead 26 which operates to press the end of the inflation out around the lip 12. The undistorted inflation has the shape clearly indicated in Fig. 2 decreasing in thickness from bottom to top and terminating at its upper end in an inwardly tapering conical portion 28 defining an aperture 30. The size of the aperture 30 is merely designed so that the distortion of the material in turning the lip out over the bead 16 is sufficient to cause the lip to be tightly pressed against the outside of the casing.

After the inflation has been assembled in the position shown in Fig. 1, the cap 32 which comprises a flat diaphragm 34 having a central aperture 36 the size of which is properly adapted to the teat of the cow, and a cylindrical portion 38 terminating in a thickened rim 40 is placed in position over the end of the inflation. The enlargement of the cap necessary to force it into assembled position is sufficient to cause the rim 40 to flatten against the lip of the inflation and firmly press it against the casing forming a satisfactorily air tight joint not only between the casing and the inflation but between the inflation and the cap. When suction is first delivered to the teat cup, atmospheric air may enter the aperture 21 to permit the inflation to collapse. The comparatively thin part being of greatest resiliency collapses first approximately to the dotted line position indicated at 42. The tendency of the teat to enter the cup under the force of the suction will also flex the diaphragm 34 downwardly, permitting a slight movement of the teat into the cup and bringing the periphery of the aperture 36 down into close proximity with the constricted portion adjacent the top of the inflation. As the suction continues, the influx of air around the outside of the inflation will cause it to collapse progressively downward towards the thicker walled portion of lesser resiliency gradually expelling the milk from the teat.

It will be apparent that the inflation may be made of pure rubber or of any composition best suited to withstand the mechanical deformation incident to the milking operation and that the cap 32 may be made of a composition best suited to resist corrosive or deteriorating action to which it may be subjected by the oily secretion from the skin glands in the teat, or in any other way. With the rubber compositions at present available, the life of a cap is a matter of about three months or so whereas the inflation will ordinarily last a year and a half or longer. It will, however, be obvious that improved compositions may greatly increase the life of both parts. According to my invention, it is possible to make each part of the composition best adapted to give the service required.

It will be noted that the inflation in collapsing to the dotted line position 42 curves inwardly from the extreme upper edge of the casing. This makes it possible to squeeze the upper portion of the teat considerably closer to the udder, making the milking action more effective. The diminution of the inactive space adjacent the upper edge of the casing secures a better fit of the parts and as the teat ordinarily enlarges rapidly where it joins the udder, a much wider range of teat sizes can be handled efficiently by the cup I have disclosed as in milking a cow with small teats the cap will slide well up onto the enlargement joining the teat and the udder without interfering with the efficiency of the milking action. It should also be noted that this range of adaptability can be materially extended by the use of caps having apertures of different sizes so that a single size of casing and inflation can be used satisfactorily on practically any size teat.

While I have illustrated and described in detail the preferred embodiment of my invention, it should be clearly understood that the disclosure is merely for purposes of illustration and that many modifications and variations will naturally occur to those skilled in the art. It will, for instance, be obvious that such an inflation as shown in my copending application, Serial No. 343,408 referred to above, may have its upper diaphragm formed of a different composition from the rest of the inflation, to increase the life of the entire inflation. I aim in the subjoined claims to cover all such legitimate variations and modifications.

I claim as my invention:

1. In a device of the class described, a casing, an inflation within said casing, the walls of said inflation extending up and over the upper edge of the walls of said casing, a connector to permit the delivery of suction to the interior of said inflation, and said casing having an aperture communicating directly with the atmosphere and permitting air to enter between said casing and said inflation.

2. In a device of the class described, a casing, an inflation adapted in undistorted condition to fit the interior of said casing throughout its length, said inflation having a resilient lip of a slightly smaller size than the upper end of said casing whereby it is adapted to grip said casing and form an air-tight joint therewith when said lip is doubled over the upper end of said casing.

3. A teat cup having, in combination, a casing, an inflation in said casing in contact therewith in undistorted condition, and a diaphragm overlying the open mouth of said inflation, said diaphragm and inflation being flexible to permit the diaphragm to flex downwardly so that the inflation in collapsing may press the teat close to the diaphragm.

4. In a device of the class described, a casing, an inflation within said casing, the walls of said inflation extending up and over the upper edge of the walls of said casing, a diaphragm at the upper end of said inflation extending over said overlying portion of said inflation forming an air-tight joint at the upper end of said casing, a connector to permit the delivery of suction to the interior of said inflation forming an air-tight joint at the lower end of said casing, said casing being provided with an aperture communicating with the atmosphere to permit air to enter in between said casing and said inflation.

In testimony whereof, I have hereunto set my hand.

FRANK S. FROST.